United States Patent [19]

Tanaka et al.

[11] Patent Number: 4,816,943
[45] Date of Patent: Mar. 28, 1989

[54] DUBBING TAPE RECORDER HAVING A COMMON TAPE DRIVING MOTOR

[75] Inventors: Shinsaku Tanaka, Tokyo; Tadao Arata, Inagi, both of Japan

[73] Assignee: Tanashin Denki Co., Ltd., Tokyo, Japan

[21] Appl. No.: 925,553

[22] Filed: Oct. 31, 1986

[51] Int. Cl.⁴ ............................................. G11B 15/68
[52] U.S. Cl. ...................................... 360/92; 360/137
[58] Field of Search .................. 360/15, 63, 69, 71, 360/91, 92, 93, 96.1–96.4, 137; 242/180, 197, 199; 379/70

[56] References Cited

U.S. PATENT DOCUMENTS

| | | | |
|---|---|---|---|
| 3,687,395 | 8/1972 | Goshima et al. | 242/180 |
| 3,921,215 | 11/1975 | Asami | 360/137 X |
| 3,968,329 | 7/1976 | Darwood | 360/92 X |
| 4,222,083 | 9/1980 | Tronzano et al. | 360/92 |
| 4,543,618 | 9/1985 | Sato | 360/63 X |

FOREIGN PATENT DOCUMENTS

| | | | |
|---|---|---|---|
| 2555380 | 6/1977 | Fed. Rep. of Germany | 379/70 |
| 5414217 | 2/1979 | Japan | 360/92 |

Primary Examiner—John H. Wolff
Attorney, Agent, or Firm—Wegner & Bretschneider

[57] ABSTRACT

A dubbing tape recorder includes first and second tape drive units having independent recording or playback functions and mechanical portions of substantially the same structure and dimensions and mounted respectively on separate chassis of substantially the same structure and dimensions. The drive units are arranged side by side as unitary subassemblies and are both driven by a common motor to drive their associated tapes. A common switch adapted for the actuation of the motor is disposed at a left or right end portion of the tape recorder. A switch operating mechanism which is actuated in the same manner no matter which one of the tape drive units is operated to actuate the motor is also arranged extending over both of the tape drive units. The switch is changed over by the switch operating mechanism to actuate the motor.

5 Claims, 7 Drawing Sheets

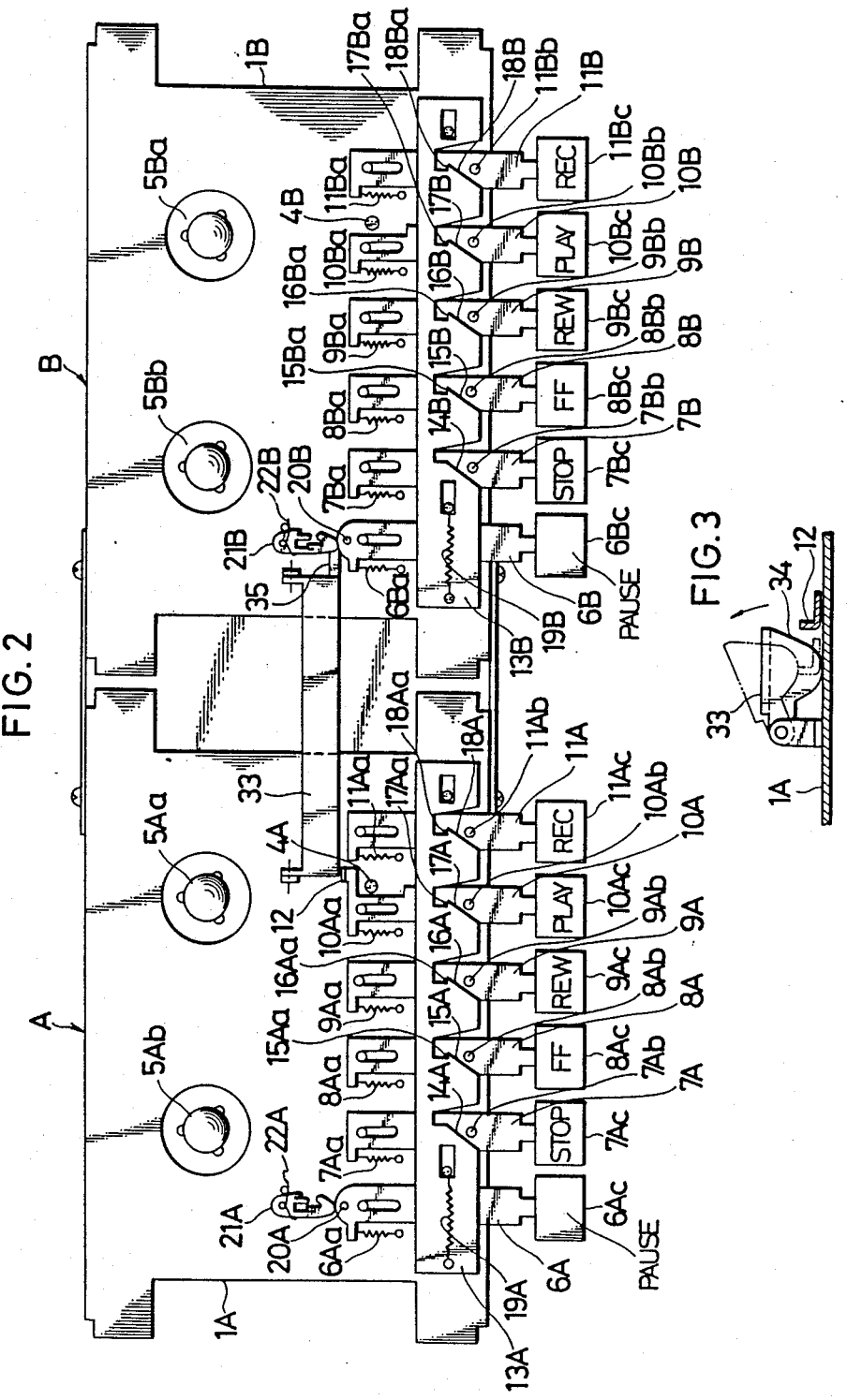

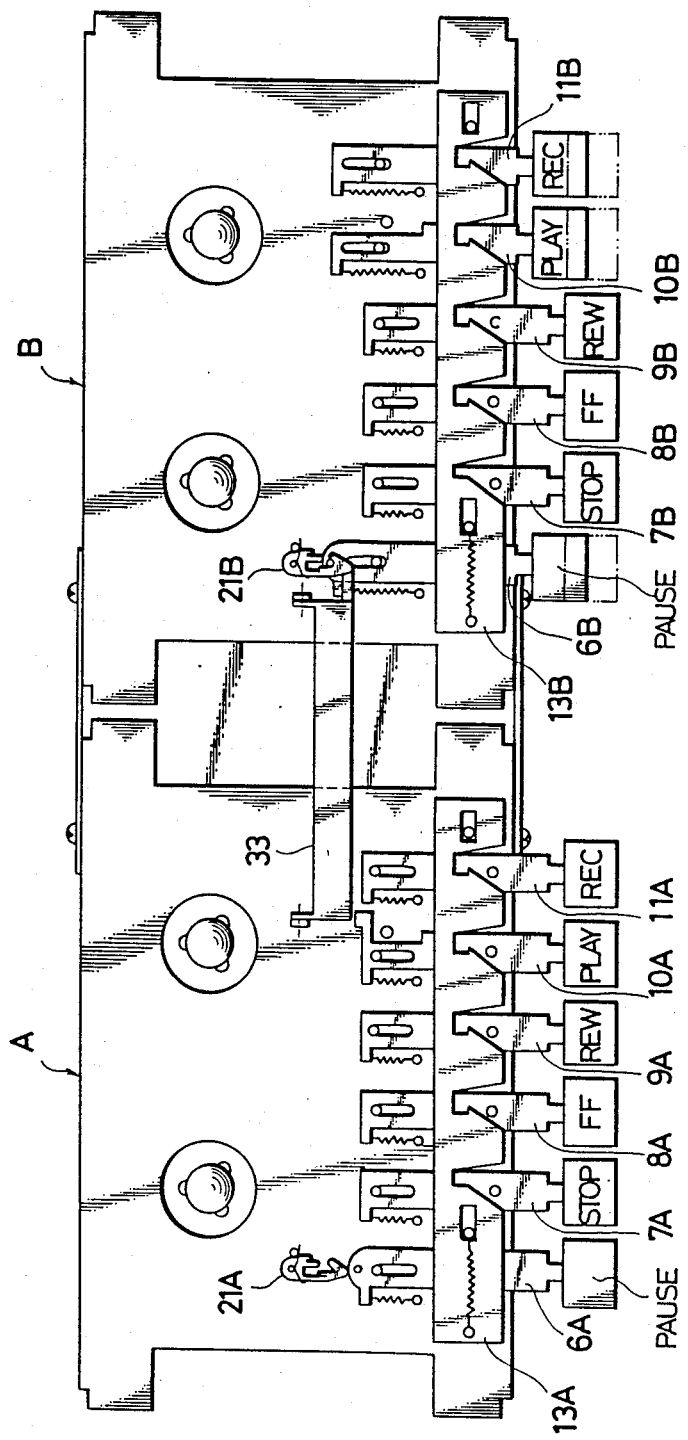

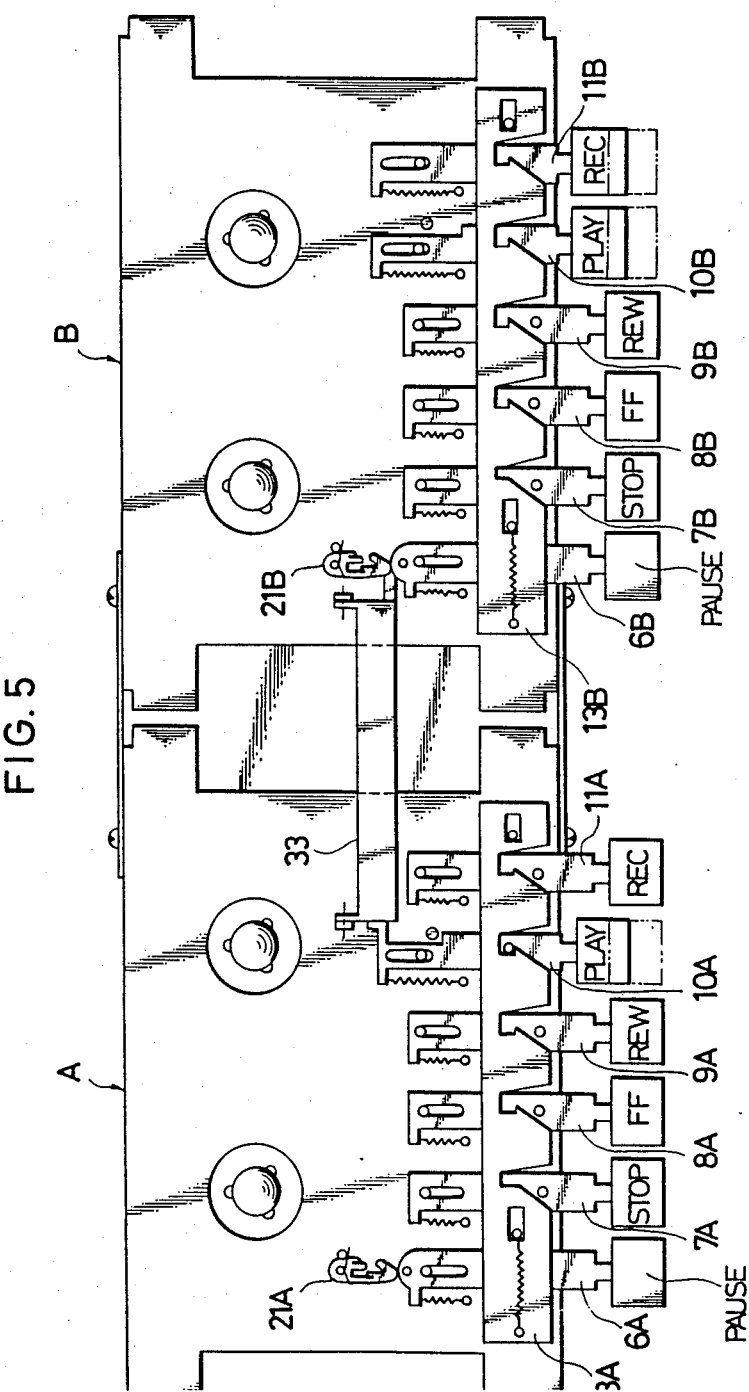

4,816,943

DUBBING TAPE RECORDER HAVING A COMMON TAPE DRIVING MOTOR

BACKGROUND OF THE INVENTION (1) Field of the Invention

This invention relates to a dubbing tape recorder of a lower manufacturing cost, and more specifically to a dubbing tape recorder having first and second tape drive units of substantially the same structure and dimensions. The term "substantially" as used herein means that although two identical tape drive units may be used as the first and second tape drive units, certain parts may be removed from either one of the identical tape drive units if such parts are unnecessary for the dubbing tape recorder.

(2) Description of the Prior Art

A tape recorder is generally manufactured in such an order that its wiring work is performed after assembling its mechanical part.

In the assembly of the mechanical part, various parts are mounted on both front and rear sides of a chassis. In the wiring work, switches and other electrical circuit components are mounted and then wired by soldering. Since such switches and other electrical components are mounted after the assembly of the mechanical part, it is advantageous to arrange them at an end portion of the chassis rather than a central portion of the same in order to facilitate their wiring work.

A dubbing tape recorder which is suitable for use in conducting dubbing, continuous recording (or playback) or the like has such a structure that two tape drive units are arranged side by side as unitary subassemblies. For tape recorders of this sort, it is desirable from the viewpoint of any one of designing, parts management, mechanism assembly work and operability to use substantially the same structure and dimensions for the first and second tape drive units where permissible. Use of substantially the same structure and dimensions can also facilitates the reduction of the manufacturing cost.

When the mechanical parts of both tape drive units are designed identically, the arrangement of switches and other electrical circuit components becomes the same. If switches are arranged for example at right end portions of the respective tape drive units, the switch of the left tape drive unit assumes a position substantially at a central part of the entire tape recorder. This structure cannot therefore facilitate the subsequent wiring work.

SUMMARY OF THE INVENTION

With the foregoing in view, the present invention has as its principal object the provision of a dubbing tape recorder in which substantially the same structure and dimensions are employed for the mechanical parts of first and second tape drive units arranged side by side, whereby the designing, parts management, mechanism assembly work and operability are improved, a common switch is solely arranged at an end portion and a further reduction to the manufacturing cost is therefore facilitated.

In one aspect of this invention, there is thus provided a dubbing tape recorder comprising first and second tape drive units having independent recording or playback functions and mechanical portions of substantially the same structure and dimensions and mounted respectively on separate chassis of substantially the same structure and dimensions, said drive units being arranged side by side as unitary subassemblies. The first and second tape drive units are both driven by a common motor to drive their associated tapes. A common switch adapted for the actuation of the motor is disposed at a left or right end portion of the tape recorder. A switch operating mechanism which is actuated in the same manner no matter which one of the tape drive units is operated to actuate the motor is arranged extending over both of the tape drive units. The switch is changed over by the switch operating mechanism to actuate the motor.

In a preferred embodiment of this invention, the switch operating mechanism comprises first and second switch operating plates provided respectively with the first and second tape drive units and a member connecting the switch operating members to each other. Each of the switch operating means defines a plurality of oblique edges on the paths of movements of interlocking means provided respectively with mode control members of the corresponding tape drive unit. The mode control members includes at least "playback" and "rewind" operating members. When either one of the "playback" and "rewind" operating members is operated to perform the desired mode, the interlocking means of the thus-operated mode control member is brought into sliding contact with the corresponding oblique edge so as to shift the first and second switch operating plates in a direction substantially perpendicular to the direction of movement of the operated mode control member, whereby the switch is operated by the first and second switch operating plates.

According to the present invention, the mechanical parts of the first and second tape drive units have substantially the same structure and dimensions so that the designing, parts management, mechanism assembly work and operability have been facilitated. Moreover, the common single switch is arranged at the one end portion of the tape recorder, thereby facilitating the wiring work. The first and second tape drive units can each be used as an ordinary tape recorder. It is hence not necessary to manufacture the first and second tape drive units exclusively for the dubbing tape recorder of this invention. A number of tape drive units of the same structure and dimensions may be manufactured. They may then be used commonly for the manufacture of dubbing tape recorders of this invention and also for the manufacture of ordinary tape recorders. The present invention can therefore provides a dubbing tape recorder which facilitates a reduction to the manufacturing cost.

BRIEF DESCRIPTION OF THE DRAWINGS

The above and other objects, features and advantages of the present invention will become apparent from the following description and the appended claims, taken along the accompanying drawings, in which:

FIG. 2 is a plan view of the same dubbing tape recorder in a stopped state;

FIG. 3 is a side view illustrating the relation between a pause releasing member and its corresponding engagement portion; and FIG. 4 through FIG. 7 are plan views illustrating the operation of the dubbing tape recorder of the first embodiment in various operation modes.

DETAILED DESCRIPTION OF THE INVENTION AND PREFERRED EMBODIMENT

Figure 1:
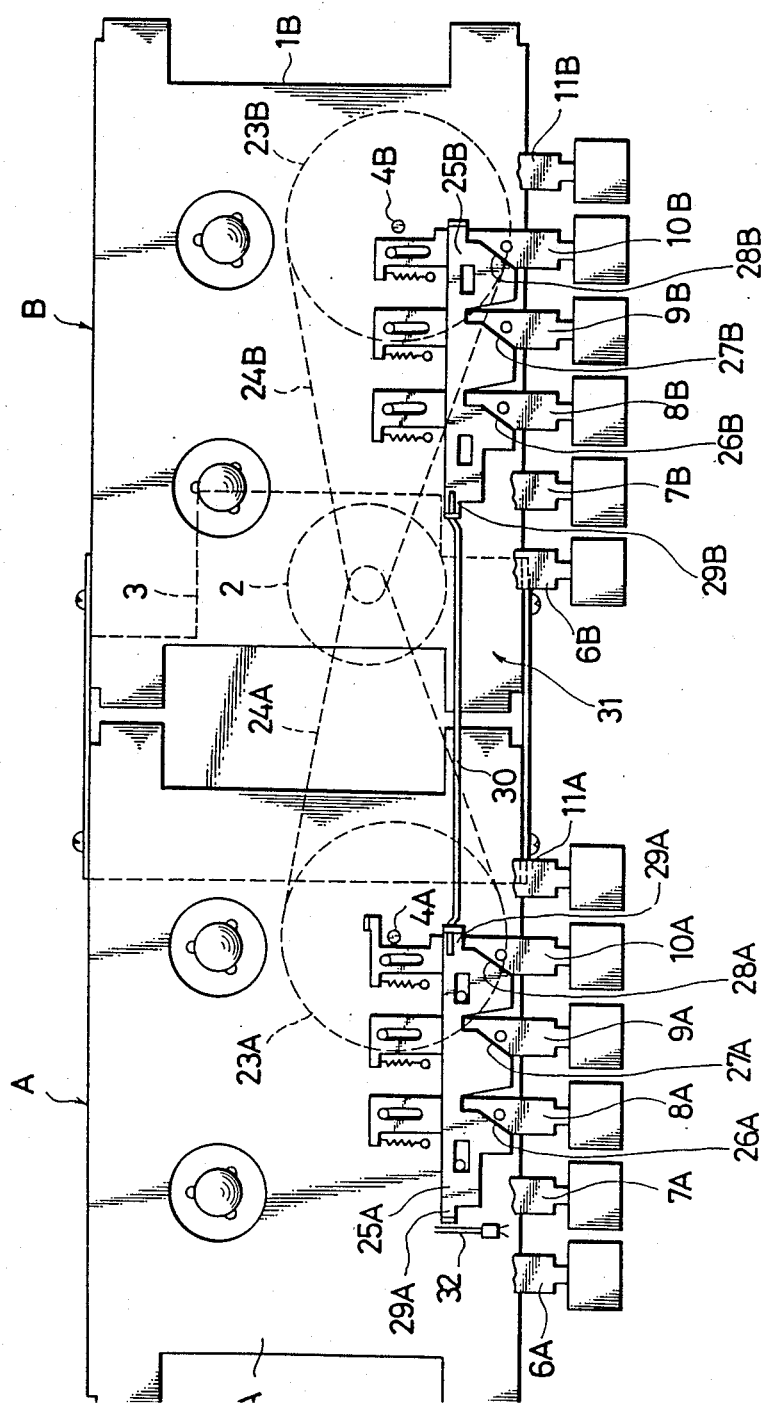
FIG. 1 is a plan view of a dubbing tape recorder according to a first embodiment of this invention, showing the relative arrangement of first and second tape drive units.

In FIG. 1, letters A,B indicate first and second tape drive units respectively. Both units A,B are arranged side by side close to each other. Their respective chassis 1A,1B, which are made of metal plates, are united together by way of a motor-mounting bracket 3 on which a motor 2 is mounted. The mechanical parts of both units A,B are of substantially the same structure and dimensions. Description will therefore be made only of the construction of the first tape drive unit A, elements of structure employed commonly for both first and second tape drive units A,B and elements of structure provided only with either one of the units A,B. With respect to the construction of the second tape drive unit B, elements corresponding to those of the first tape drive unit A are identified by the same reference numerals except for the substitution of "B" for "A", and their description is omitted herein. Further, elements employed commonly for both first and second tape drive units A,B or those provided only with either one of the units A,B are identified by their corresponding reference numerals which are accompanied by neither "A" nor "B".

As illustrated in FIG. 2, a capstan 4A and a pair of reel shafts 5A$a$,5A$b$, on which a tape cassette is loaded, are provided on the chassis 1A. There are also provided along the front edge of the chassis 1A a "pause" operating member 6A, "stop" operating member 7A, "fast feed (FF)" operating member 8A, "rewind" operating member 9A, "playback" operating member 10A and "record" operating member 11A arranged in order from the left as viewed in FIG. 2. Although not shown in the drawing, an automatic stop device (not shown) is also provided to automatically stop a tape when the tape has been fully wound up.

The respective operating members 6A–11A can all be caused to advance and retreat in the upward and and downward directions as viewed in the drawings. They are however normally biased in the downward direction as viewed in the drawings by their corresponding springs 6A$a$,7A$a$,8A$a$,9A$a$,10A$a$,11A$a$ and maintained at their respective positions depicted in FIG. 1. The individual operating members 7A–11A other than the "pause" operating member 6A are provided with their respective interlocking pins 7A$b$,8A$b$,9A$b$, 10A$b$,11A$b$. Push buttons 6A$c$,7A$c$,8A$c$,9A$c$,10A$c$,11A$c$ are attached to the front ends of the operating members 6A–11A respectively. An engagement portion 12 is formed on the right edge of the "playback" operating member 10A.

In addition, an interlocking member 13A in the form of a plate is also provided with the chassis 1A in such a way that the interlocking member 13A overlies the operating members 6A–11A and is reciprocal horizontally as viewed in FIG. 2. The interlocking member 13A defines oblique edges 14A,15A,16A,17A,18A respectively on the paths of movements of the respective interlocking pins 7A$b$,8A$b$,9A$b$,10A$b$,11A$b$. The oblique edges 14A,15A,16A,17A,18A are inclined in the same direction. The oblique edges 15A–18A, which correspond respectively to the interlocking pins 8A$b$, 9A$b$,10A$b$,11A$b$ of the respective operating members 8A–11A except for the "stop" operating member 7A in particular, upwardly terminate in hook portions 15A$a$, 16A$a$,17A$a$,18A$a$ respectively. The interlocking member 3A is normally biased by a spring 19A in the rightward direction as viewed in FIG. 2. When any one of the operating members other than the "pause" operating member 6A is displaced upwardly as viewed in FIG. 2, the interlocking pin of the operating member is brought into sliding contact with its corresponding oblique edge so that the interlocking member 13A is shifted to the left against the spring 19A.

When any one of the "FF" operating member 8A, "rewind" operating member 9A, "playback" operating member 10A and "record" operating member 11A is selectively pushed and its interlocking pin 8A$b$, 9A$b$, 10A$b$ or 11A$b$ is displaced beyond the upper end of the corresponding oblique edge 15A, 16A, 17A or 18A, the interlocking pin 8A$b$, 9A$b$, 10A$b$ or 11A$b$ is brought into engagement with its corresponding hook portion 15A$a$, 16A$a$, 17A$a$ or 18A$a$ and the the operating member 8A, 9A, 10A or 11A is maintained in its pushed position. While the "playback" operating member 10A is maintained in its pushed position, a magnetic head (not shown) is maintained in contact with a magnetic tape (not shown) and a pinch roller (not shown) is also maintained in contact under pressure with the capstan 4A. Therefore, the first tape drive unit A is maintained in the playback mode. While the "playback" operating member 10A and "record" operating member 11A are both maintained in their pushed positions, the first tape drive unit A is maintained in the recording mode. While the "FF" operating member 8A is maintained in its pushed position, the reel shaft 5A$a$ on the winding side rotates at a high speed so that the first tape drive unit A is maintained in the "FF" mode. While the "rewind" operating member 9A is maintained at its pushed position, the reel shaft 5A$b$ on the feeding side rotates at a high speed so that the first tape drive drive unit A is maintained in the "rewind" mode. When the "stop" operating member 7A is pushed, the interlocking member 13A is shifted leftwards owing to the sliding contact between the interlocking pin 7A$b$ and the oblique edge 14A. As a consequence, the operating member which has been maintained at its pushed position is released from its hooked position and the first tape drive unit A takes the "stop" state shown in FIG. 2. When the tape has been taken up fully, the automatic stop device is actuated to shift the interlocking member 13A leftwards too so that the first tape drive unit A also takes the "stop" state.

An interlocking pin 20A is provided at the free end of the "pause" operating member 6A, while a "pause" hook 21A corresponding to the interlocking pin 20A is provided on the chassis 1A.

The "pause" hook 21A is pivotally supported at one end thereof on the chassis 1A and is normally biased in one direction by a spring 22A. When the "pause" operating member 6A is pushed, the "pause" hook 21A catches the interlocking pin 20A to hold the "pause" operating member 6A at its pushed position. By pushing the "pause" operating member 6A again, its is released from the held position. Incidentally, a "pause" hook 21B of the second tape drive unit B releases the "pause" operating member 6B from the held state of the latter by pushing the "pause" operating member 6B or lifting the "pause" hook 21B from the chassis 1B.

By the way, the "pause" operating member 6A maintains the tape drive unit A in a stand-by state for the playback mode while the "pause" operating member 6A and the "playback" operating member 10A are both held at their pushed positions. The tape drive unit A is on the other hand maintained in a stand-by state for the recording mode while the "pause" operating member 6A, the "playback" operating member 10A and the "record" operating member 11A are all held at their pushed positions.

A flywheel 23A is attached to the lower extremity of the capstan 4A as shown in FIG. 1. An endless belt 24A is mounted on the flywheel 23A and the drive shaft of the motor 2. Incidentally, the position of the motor 2 is chosen below the right tape drive unit B as depicted in FIG. 1 for the following reasons. Namely, the positions of the capstans 4A,4B and flywheels 23A,23B are chosen near the right ends of the chassis 1A,1B in both first and second drive units A,B. In order to mount the endless belts 24A,24B of the units A,B commonly on the motor 2, the mounting position of the motor 2 must be chosen at a position equidistant from the capstans 4A,4B of the first and second tape drive units A,B. As a consequence, the motor 2 is located below the second tape drive unit B.

As shown in FIG. 1, a switch operating plate 25A is also provided reciprocally in the horizontal direction as viewed in the drawing. The switch operating plate 25A overlies the interlocking member 13A. The switch operating plate 25A defines oblique edges 26A,27A,28A on the paths of movements of the interlocking pins 8A$b$,9A$b$,10A$b$ of the "FF" operating member 8A, "rewind" operating member 9A and "playback" operating member 10A respectively. The oblique edges 26A,27A,28A are tilted in the same direction. The switch operating plate 25A has a switch operating end portion 29 at a left-hand end portion thereof. The switch operating plates 25A,25B of the first and second tape drive units A,B are connected together by way of a rod-like connecting member 30. The switch operating plates 25A,25B of the first and second tape drive units A,B and the connecting member 30 constitute a switch operating mechanism 31 in combination. When the "FF" operating member 8A, "rewind" operating member 9A or "playback" operating member 10A is pushed, the interlocking pin 8A$b$, 9A$b$ or 10A$b$ of the operating member is brought into sliding contact with the corresponding oblique edge 26A, 27A or 28A so as to shift the switch operating plate 25B in the leftward direction. When the switch operating plate 25B of the second tape drive unit B is shifted, its motion is also transmitted to the switch operating plate 25A of the first tape drive unit A via the connecting member 30. As a result, both switch operating plates 25A,25B are shifted leftwards.

A leaf switch 32 of the normally open type is provided on the chassis 1A of the first tape drive unit A at a left end portion of the chassis 1A as shown in FIG. 1. This switch 32 is adapted to feed a current to the motor 2 so as to control the latter. The switch 32 is located on the left of and in adjacent to the switch operating end portion 29 of the switch operating plate 25A. When the switch operating plate 25A moves leftwards, the switch 32 is pushed by the associated switch operating end portion 29 of the switch operating plate 25A and is hence closed. In order to apply the same structure and dimensions to the mechanical part of the second tape drive unit B as the first tape drive unit A, a switch mounting portion may be provided with the chassis 1B but no switch is mounted there.

A "pause" releasing member 13 is arranged between the first and second tape drive units A,B, extending over both units A,B as illustrated in FIG. 2. The member 13 is pivotally supported at both ends thereof on the chassis 1A,1B of the first and second tape drive units A,B respectively. On a left end portion of the member 13, it has a downwardly convex cam surface 34 which undergoes sliding contact with the engagement portion 12 provided on the "playback" operating member 10A of the first tape drive unit A as shown in FIG. 3. The member 13 terminates, at the right end thereof, in an extension 35 which is located behind the "pause" hook 21B of the second tape drive unit B. Whenever the "playback" operating member 10A of the first tape drive unit A is pushed or is allowed to return to its normal position, the engagement portion 12 of the "playback" operating member 10A of the first tape drive unit A is brought into sliding contact with the cam surface 34 so that the "pause" releasing member 33 is turned. As a result, the free end of the "pause" hook 21B is lifted by the extension 35. If the "pause" operating member 6B of the second tape drive unit B is held at its pushed position by the "pause" hook 21B at this stage, the "pause" operating member 6B is released from the held position owing to the upward displacement of the "pause" hook 21B, thereby allowing the "pause" operating member 6B to return by the spring 6B$a$ to its initial position shown in FIG. 2.

When a dubbing operation is performed by using the above-described dubbing tape recorder, tape cassettes are first of all loaded on the first and second tape drive units A,B respectively. The "playback" operating member 10B, "record" operating member 11B and "pause" operating member 6B of the second tape drive unit B are then pushed so that they are held at their pushed positions by the interlocking member 13B and "pause" hook 21B. Here, the switch operating mechanism 31 is shifted leftwards owing to the pushing operation of the "playback" operating member 10B. As a result, the switch 32 is pushed by the switch operating end portion 29 of the first tape drive unit A and is hence switched over to "ON" from "OFF". Accordingly, the motor 2 is operated and as shown in FIG. 4, the second tape drive unit B takes a stand-by state for the recording mode. When the "playback" operating member 10A of the first unit A is then pushed, the engagement portion 12 undergoes sliding contact with the cam surface 34 of the "pause" releasing member 3 until the "playback" operating member 10A is held at its pushed position by the interlocking member 13A. As a consequence, the "pause" releasing member 33 is turned and the "pause" hook 21B of the second tape drive unit B is thus lifted by the extension 35 of the "pause" releasing member 33, whereby the interlocking pin 20B of the "pause" operating member 6B is released from the "pause" hook 21B. Accordingly, the "pause" operating member 6B is allowed to return to its initial position and the dubbing tape recorder takes the form shown in FIG. 5. Therefore, a playback operation by the first tape drive unit A and a recording operation by the second tape drive unit B are started at the same time.

Figure 6:
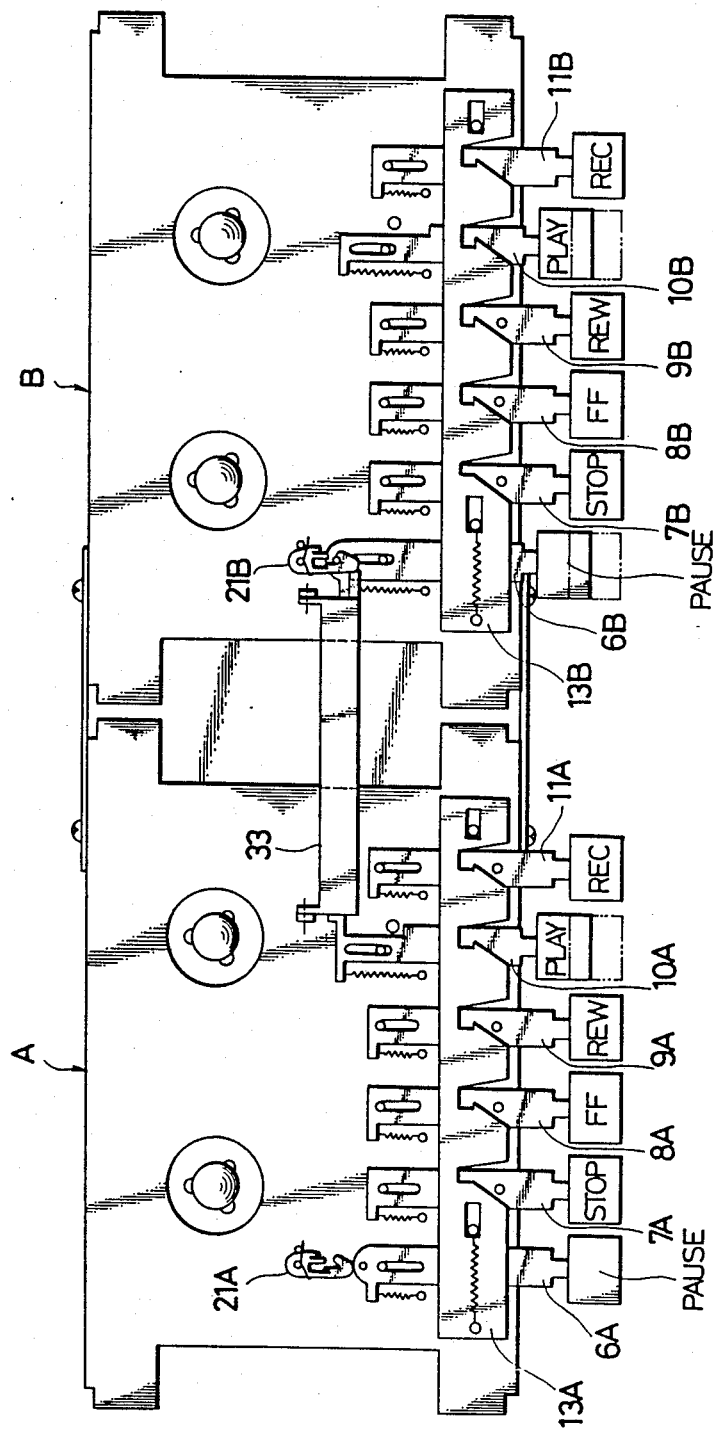
Figure 7:
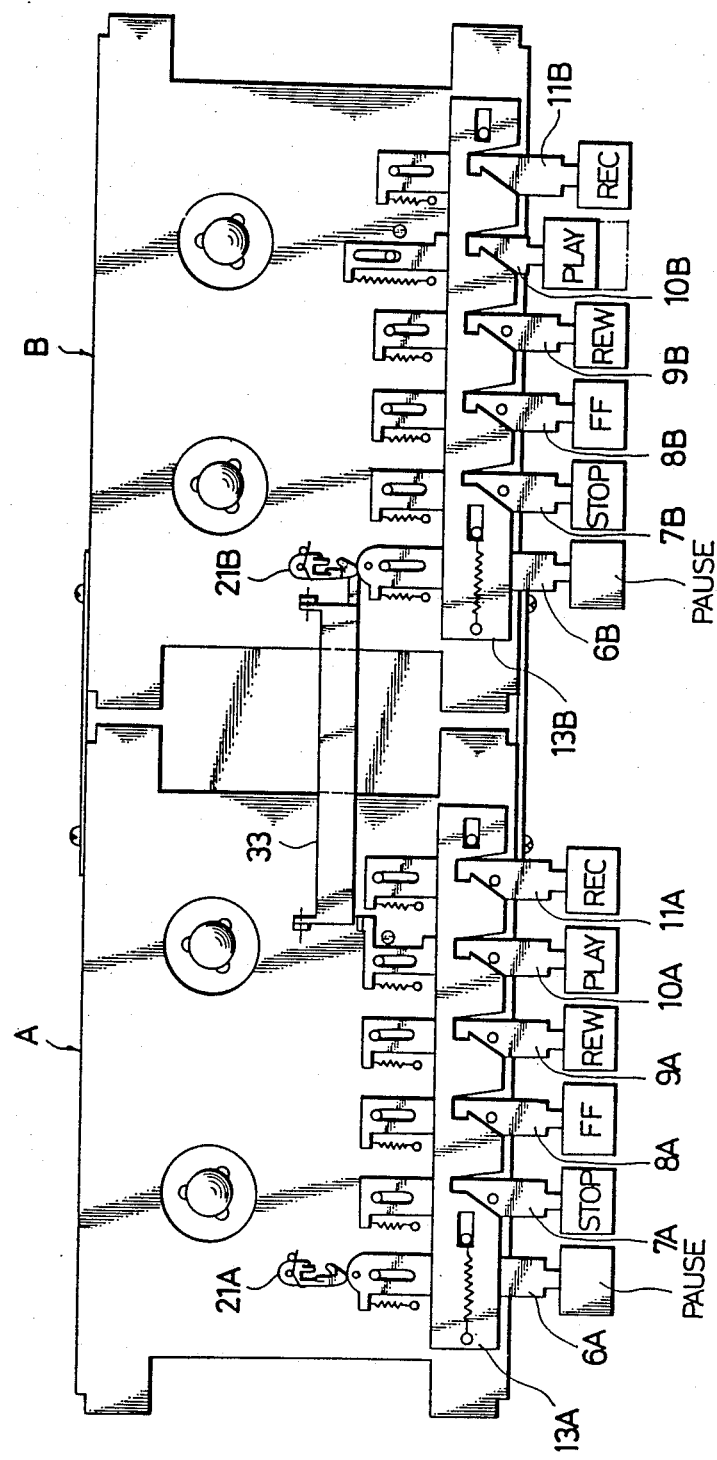

In order to conduct a continuous playback operation, tape cassettes are first of all loaded on the first and second tape drive units A,B respectively. The "playback" operating member 10A of the first tape drive unit A is then pushed. As a result, the "playback" operating member 10A is maintained at its pushed position by the interlocking member 13A. At the same time, the switch operating plate 25A is shifted leftwards by the pushing operation of the "playback" operating member 10A, and the switch 32 is then pushed by the switch operating end portion 29 of the switch operating plate 25A and is hence switched over to "ON" from "OFF". Therefore, the motor 2 is operated to start a playback operation in the first tape drive unit A. While the first tape drive unit A is maintained in the playback mode, the "playback" operating member 10B and "pause" operating member 6B of the second tape drive unit B are pushed so as to hold them at their pushed positions by the interlocking member 13B and "pause" hook 21B respectively. The dubbing tape recorder thus takes a stand-by state for the playback mode as illustrated in FIG. 6. If the tape is, for example, taken up fully in the above state and the "playback" operating member 10A returns to its initial position in the first tape drive unit A, the engagement portion 12 undergoes sliding contact with the cam surface 34 of the "pause" releasing member 33 in the course of the returning motion of the "playback" operating member 10A and the "pause" releasing member 33 is hence caused to turn. As a result, the "pause" hook 21B of the second tape drive unit B is lifted by the extension 35 of the "pause" releasing member 33 and the interlocking pin 20B of the "pause" operating member 6B is released from the "pause" hook 21B. Accordingly, the "pause" operating member 6B returns to its initial position and the dubbing tape recorder takes the position shown in FIG. 7. Simultaneously with the completion of the playback operation by the first tape drive unit A, the second tape drive unit B begins to perform a playback operation.

In the case of a continuous recording operation, the same operation is performed as the continuous playback operation except that the "playback" operating members 10A,10B and "record" operating members 11A,11B are simultaneously maintained at their pushed positions.

Since the mechanical parts of the first and second tape drive units A,B arranged side by side are of substantially the same structure and dimensions in the above-described construction, their designing, parts management, mechanism assembly work and operability are facilitated. As the single switch 32 is disposed at the left end portion of the tape drive unit A located on the left-hand side, wiring work can be carried out easily after the assembly of the mechanical parts. As a result, the manufacturing cost can be reduced further.

Furthermore, the second tape drive unit B located on the right-hand side is not provided with any switch. The space required for mounting a switch is therefore left over. The motor 2 can hence be arranged there, thereby making it possible to adopt a structure convenient to allow the endless belts 24A,24B of both tape drive units A,B to have the same dimensions.

Having now fully described the invention, it will be apparent to one of ordinary skill in the art that many changes and modifications can be made thereto without departing from the spirit or scope of the invention as set forth herein.

We claim:

1. A dubbing tape recorder comprising:
   first and second tape drive units having independent recording or playback function and mechanical portions of substantially the same structure and dimension and mounted respectively on separated chassis of substantially the same structure and dimensions, said drive units being arranged side by side as unitary subassemblies;
   a common motor for driving the associated tapes of the first and second tape drive units;
   a common switch for actuation of the motor disposed at an end portion of the tape recorder; and
   a switch operating means for changing over the switch to actuate the motor, said means being operatively coupled to said switch and disposed above both of the tape drive units, said switch operating means being actuated in the same manner to actuate the motor, no matter which one of the tape drive units is operated.

2. The dubbing tape recorder as claimed in claim 1, wherein the switch operating means comprises first and second switch operating plates provided respectively with the first and second tape drive units and a connecting member connecting the switch operating plates to each other, each of the switch operating plates defining a plurality of oblique edges in the paths of movement of interlocking means provided respectively with mode control members of the corresponding tape drive unit, said mode control members including at least "playback" and "rewind" operating members, so that when either one of the mode control members is operated to perform the desired mode, the interlocking means of the thus-operated mode control member is brought into sliding contact with the corresponding oblique edge so as to shift the first and second switch operating plates in a direction substantially perpendicular to the direction of movement of the operated mode control member, whereby the switch is operated by the first and second switch operating plates.

3. The dubbing tape recorder as claimed in claim 2, wherein the mode control members further include a "fast forward" operating member and the switch is operated by the first and second operating plates when the "playback" operating member or either the "rewind" operating member or the "fast forward" operating member is operated to perform the desired mode.

4. The dubbing tape recorder as claimed in claim 1, wherein the motor is equidistant from capstans of the first and second tape drive units.

5. The dubbing tape recorder as claimed in claim 1, wherein the motor is mounted on a bracket and the chassis of the first and second drive units are connected together by the bracket.

* * * * *